United States Patent
Fischer et al.

(10) Patent No.: US 9,764,283 B2
(45) Date of Patent: Sep. 19, 2017

(54) SCRUBBING SOLUTION FOR ABSORPTION OF CARBON DIOXIDE AND METHOD FOR ACCELERATING THE ABSORPTION BY GERMANIUM DIOXIDE

(71) Applicant: Siemens Aktiengesellschaft, Munich (DE)

(72) Inventors: Bjorn Fischer, Dusseldorf (DE); Ralph Joh, Seligenstadt (DE); Markus Kinzl, Dietzenbach (DE); Diego Andres Kuettel, Kassel (DE); Rudiger Schneider, Eppstein (DE)

(73) Assignee: Siemens Aktiengesellschaft, Munich (DE)

( * ) Notice: Subject to any disclaimer, the term of this patent is extended or adjusted under 35 U.S.C. 154(b) by 126 days.

(21) Appl. No.: 14/414,110

(22) PCT Filed: Jul. 8, 2013

(86) PCT No.: PCT/EP2013/064345
§ 371 (c)(1),
(2) Date: Jan. 11, 2015

(87) PCT Pub. No.: WO2014/012808
PCT Pub. Date: Jan. 23, 2014

(65) Prior Publication Data
US 2015/0165375 A1    Jun. 18, 2015

(30) Foreign Application Priority Data

Jul. 17, 2012 (DE) ........................ 10 2012 212 482

(51) Int. Cl.
*B01D 53/62* (2006.01)
*B01D 53/14* (2006.01)
(Continued)

(52) U.S. Cl.
CPC ..... *B01D 53/8671* (2013.01); *B01D 53/1475* (2013.01); *B01D 53/1493* (2013.01);
(Continued)

(58) Field of Classification Search
None
See application file for complete search history.

(56) References Cited

U.S. PATENT DOCUMENTS 3,790,503 A    2/1974 McCartney
5,556,603 A    9/1996 Succi et al.
(Continued)

FOREIGN PATENT DOCUMENTS

CN    1094377 A    11/1994
CN    1636863 A    7/2005
(Continued)

OTHER PUBLICATIONS

Database WPI; "Database WPI, Week 200618"; Thomson Scientific; pp. 1-3; XP002714413; 2006; GB; Feb. 16, 2006.
(Continued)

*Primary Examiner* — Daniel Berns
(74) *Attorney, Agent, or Firm* — Beusse Wolter Sanks & Maire

(57) ABSTRACT

A scrubbing solution is provided having an absorbent for carbon dioxide based on amines, or ethanolamines, or amino acid salts, or potash, or a combination thereof, and an additive activating the absorption rate, wherein the activating additive is a germanium dioxide. A corresponding method for accelerating the absorption of carbon dioxide is also provided, wherein a carbon dioxide-containing gas is contacted with such a scrubbing solution, wherein the carbon dioxide is physically dissolved in the scrubbing solution and is chemically absorbed with the participation of the absorbent, and wherein the germanium dioxide acts catalytically for at least one reaction step of the chemical absorption of the carbon dioxide.

16 Claims, 4 Drawing Sheets

(51) Int. Cl.
*B01D 53/78* (2006.01)
*B01D 53/86* (2006.01)

(52) U.S. Cl.
CPC ............ *B01D 53/62* (2013.01); *B01D 53/78* (2013.01); *B01D 2251/306* (2013.01); *B01D 2251/606* (2013.01); *B01D 2252/10* (2013.01); *B01D 2252/204* (2013.01); *B01D 2252/20484* (2013.01); *B01D 2252/20494* (2013.01); *B01D 2252/602* (2013.01); *B01D 2255/209* (2013.01); *B01D 2257/504* (2013.01); *B01D 2258/0283* (2013.01); *Y02C 10/04* (2013.01); *Y02C 10/06* (2013.01)

(56) References Cited

U.S. PATENT DOCUMENTS

| | | | | |
|---|---|---|---|---|
| 5,738,956 | A | * | 4/1998 | Komoda ............ H01M 10/08 429/205 |
| 6,267,939 | B1 | | 7/2001 | Gemes et al. |
| 2004/0123735 | A1 | | 7/2004 | Watanabe et al. |
| 2005/0106090 | A1 | | 5/2005 | Agarwal et al. |
| 2011/0059845 | A1 | | 3/2011 | Fryxell |
| 2011/0182799 | A1 | | 7/2011 | Li |
| 2015/0011523 | A1 | * | 1/2015 | Isaev .................. C07F 7/30 514/188 |

FOREIGN PATENT DOCUMENTS

| | | | | |
|---|---|---|---|---|
| JP | 2006045456 | A | | 2/2006 |
| KR | 20110073284 | A1 | | 6/2011 |
| RU | 2244587 | C2 | | 1/2005 |
| RU | 2275231 | C2 | | 4/2006 |
| RU | 2476436 | C1 | * | 2/2013 ............ A61K 31/28 |
| WO | 9904885 | A1 | | 2/1999 |
| WO | 2004045767 | A2 | | 6/2004 |

OTHER PUBLICATIONS

RU Office Action dated Apr. 24, 2017, for RU patent application No. 2015105182.

* cited by examiner

SCRUBBING SOLUTION FOR ABSORPTION OF CARBON DIOXIDE AND METHOD FOR ACCELERATING THE ABSORPTION BY GERMANIUM DIOXIDE

CROSS REFERENCE TO RELATED APPLICATIONS

This application is the US National Stage of International Application No. PCT/EP2013/064345 filed Jul. 8, 2013, and claims the benefit thereof. The International Application claims the benefit of German Application No. DE 102012212482.9 filed Jul. 17, 2012. All of the applications are incorporated by reference herein in their entirety.

FIELD OF INVENTION

The invention relates to a scrubbing solution having an absorbent for carbon dioxide and an additive activating the absorption rate. The invention further relates to a corresponding method for accelerating the absorption of carbon dioxide.

BACKGROUND OF INVENTION

A fossil-fuel power plant for generating electric energy produces a flue gas comprising carbon dioxide in particular by the combustion of a fossil fuel. To reduce the emission of carbon dioxide ($CO_2$), a known secondary measure is to remove the carbon dioxide from the flue gas by means of a flue gas scrub. The absorption-desorption procedure is customary in particular. On a large industrial scale this involves the flue gas being contacted in an absorber with a scrubbing solution comprising an absorbent, scrubbing the carbon dioxide out of the flue gas into the scrubbing solution ($CO_2$ capture process). The carbon dioxide is initially dissolved physically in the scrubbing solution and then chemically absorbed by the adsorbent. The scrubbing solution laden with carbon dioxide is subsequently sent into a desorber where, by raising the temperature, the carbon dioxide can be desorbed and, for example, sent into suitable storage. The absorbent is regenerated in the process, so it can be reintroduced into the absorber for renewed absorption.

Commonly used absorbents are based in particular on primary, secondary or tertiary amines or a mixture thereof, and display good selectivity and high capacity for the absorption of carbon dioxide. The chemical industry employs mainly the primary amine MEA (monoethanolamine) for its fast absorption kinetics. However, the energy efficiency of primary amines in an absorption-desorption process is poor, since the regeneration energy requirements are comparatively high. Since energy efficiency is not the primary concern in the chemical industry, the energy-related disadvantages could hitherto be very largely neglected. In power plants for power generation, by contrast, it is specifically the energy requirements of the $CO_2$ capture process which are of considerable importance, since their magnitude has an appreciable influence on the overall efficiency of the power plant.

To avoid the energy-related disadvantage, therefore, the absorbents used for treating the flue gas of a power plant are sterically hindered amines (with regard to bicarbonate formation), secondary or tertiary amines, amino acid salts and/or potash solutions. These absorbents have distinctly reduced regeneration energies, which manifests itself in a lower efficiency drop for the power plant. In addition, secondary and tertiary amines have a higher loading capacity for carbon dioxide than primary amines.

However, the primary amine compounds do have the advantage of distinctly faster absorption kinetics. So, compared with secondary amines or amino acid salts, the absorber columns or reactors, in which the carbon dioxide is absorbed, can be designed smaller, which leads to lower capital costs. Sterically hindered, secondary or tertiary amines or amino acid salts have slower reaction kinetics because they form unstable carbamate products, if any at all.

The advantage of amino acid salts over heterocyclic amines or alkanolamines is in turn that amino acid salts have no noticeable vapor pressure and thus do not evaporate and can be dragged out into the environment during the separation process. Heterocyclic amines and alkanolamines are volatile and are dragged out by the cleaned flue gas as it passes into the environment, leading to adverse environmental impacts.

SUMMARY OF INVENTION

It is an object of the present invention to provide a carbon dioxide absorption scrubbing solution which combines a high rate of absorption with low regeneration energy requirements and is very environmentally compatible. It is a further object of the present invention to devise a method for accelerating the absorption of carbon dioxide, wherein a gas comprising carbon dioxide is contacted with a scrubbing solution comprising an absorbent with absorption of carbon dioxide.

That object of the invention which is directed to a scrubbing solution is achieved by a scrubbing solution comprising an absorbent on the basis of amines, or ethanolamines, or amino acid salts, or potash, or a combination thereof, and an activator additive, wherein the activator additive is a germanium dioxide.

The invention here proceeds in a first step from the consideration that the chemical absorption of carbon dioxide takes place straight away in the scrubbing solution's boundary layer with the gas, where the carbon dioxide is initially dissolved physically. Hence the reaction involved in absorbing the carbon dioxide has an effect on the concentration profile in the boundary layer. The absorption kinetics as a whole, i.e., including the physically dissolving step, which precedes the actual absorption, is accordingly influenced as such by the reaction rate of the chemical absorption in particular. An increase in the reaction rate accordingly leads to an increase in the pickup rate for carbon dioxide from the gas to be cleaned.

The admixture of an activator or a hydration catalyst to a relatively slow-reacting absorbent, for example the aforementioned secondary or tertiary amines, amino acid salts or potash, could accordingly be used to accelerate the absorption of gaseous carbon dioxide by the scrubbing solution while at the same time retaining its energy-related advantages with regard to the regeneration.

From in-house studies, activators of this type are known to include, for example, metal oxides with transition metals such as, for example, vanadium, molybdenum, tungsten or titanium or with semi-metals such as, for example, arsenic or selenium. It is also possible to use acids of arsenic, selenium, bromine or phosphorus as activators of this type. Such activators or catalysts do accelerate the absorption reaction with dissolved carbon dioxide, but are rejected by power plant operators for example as further additives in the scrubbing solution which have a toxic effect in some instances.

The inventors found in a second step that the absorption reaction of the absorbent with carbon dioxide is also accelerated by the use of germanium dioxide except that germanium dioxide has the immense advantage of being a non-toxic compound. Using germanium dioxide in the alkaline flue gas scrub for absorption of carbon dioxide thus makes it possible to use a non-toxic additive to enable the use of kinetically slow absorbents such as secondary or tertiary amines, amino acid salts or potash while at the same time taking advantage of their low regeneration energy requirements. The addition of germanium dioxide causes the absorption reaction to accelerate, so the pickup rate for carbon dioxide from the off-gas to be cleaned is increased overall.

Owing to the overall increase achieved in the pickup rate for carbon dioxide, the absorption column can be designed smaller, making it possible to reduce the capital costs for a $CO_2$ capture installation.

The invention is more particularly also based on the finding that even small amounts of an inorganic activator are sufficient to appreciably accelerate the absorption of carbon dioxide.

Since the activator germanium dioxide is added in but very small amounts, this is unlikely to result in increased regeneration energy requirements. In fact, these may even be further reduced by the admixture of the activator additive, since a correspondingly higher loading is achieved in the absorber and the driving force increases by virtue of the increased partial pressure difference in the desorber. Savings accordingly result not only in the design of the absorber owing to the increased absorption rate but also in the regeneration energy requirements.

A 0.01 to 10 weight percent proportion of germanium dioxide in the scrubbing liquid has been found to be advantageous. However, the amount of germanium dioxide must be kept to a minimum in order to minimize possible adverse effects of an inorganic catalyst on the scrubbing solution. A 0.05 to 2 weight percent proportion of germanium dioxide has therefore proved particularly advantageous. It must here be noted in principle that inorganic catalysts do not take part in the $CO_2$ absorption. They catalyze in particular the carbamate-water reaction (hydration), forming bicarbonate in the process. The proportion of the catalyst in the scrubbing solution must therefore be chosen so as to optimize as far as possible the ratio of the proportions between germanium dioxide and absorbent in the scrubbing solution.

Useful absorbents include, in particular, sterically hindered, secondary or tertiary amines and amino acid salts or a mixture of these. Their use ensures that the energy-related advantage as regards regeneration is exploited to the max with the accelerated absorption kinetics (due to the admixture of germanium dioxide). The efficiency loss of a power plant due to connecting up a carbon dioxide separator is minimized.

The scrubbing solution is advantageously in the form of an aqueous solution.

Useful amino acids for the amino acid salts used include in particular those derived from sarcosine, N,N-dimethylalanine, taurine, alpha-alanine, beta-alanine, N-methylalanine, proline, homotaurine or glycine.

The object directed to a method is achieved according to the present invention by a method for accelerating the absorption of carbon dioxide, wherein a gas comprising carbon dioxide is contacted with a scrubbing solution comprising an absorbent based on amines, or ethanolamines, or amino acid salts, or potash, or a combination, and also a germanium dioxide, with absorption of carbon dioxide, wherein the carbon dioxide is physically dissolved in the scrubbing solution and chemically absorbed by the absorbent, and wherein the germanium dioxide is catalytically active for at least one reaction step of the chemical absorption of carbon dioxide.

Advantageously, the germanium dioxide is adjusted in the scrubbing solution to a proportion of 0.01 to 10 weight percent. More advantageously the proportion of germanium dioxide is from 0.05 to 2 weight percent.

Advantageous absorbents comprise sterically hindered, secondary or tertiary amines and/or amino acid salts.

In an alternative, the gas which is treated as comprising carbon dioxide is the flue gas of a fossil fuel steam power plant, of a gas turbine plant or of a combined gas and steam turbine plant.

BRIEF DESCRIPTION OF THE DRAWINGS

Exemplary embodiments of the invention will now be more particularly described with reference to a drawing, where.

DETAILED DESCRIPTION OF INVENTION

Figure 1:
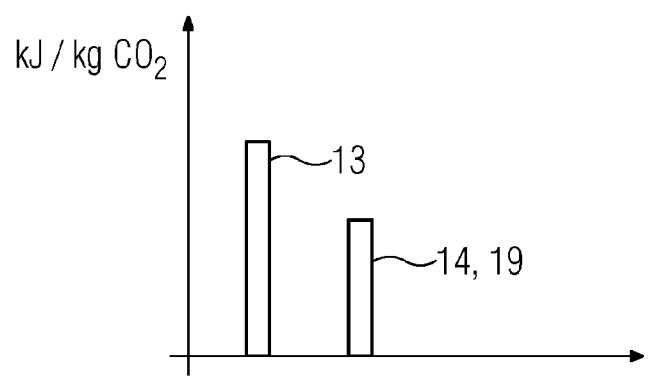
FIG. 1 shows a chart featuring a comparison of different scrubbing solutions.

The chart depicted in FIG. 1 shows the specific energy required for removing carbon dioxide from a flue gas of a power plant, in kJ per removed kg of $CO_2$. The axis is unscaled because the energy required is essentially also dependent on other process parameters, such as pressure, temperature, circulation volume, flue gas mass flow, etc., which will not be more particularly discussed herein, however.

The bars represent different scrubbing solutions 13 and 14. The bar at left shows a scrubbing solution 13 comprising a secondary amino acid salt as absorbent. The bar at right shows a scrubbing solution 14 comprising a secondary amino acid salt and a proportion of germanium dioxide as activator additive. The ratio in scrubbing solution 14 between secondary amino acid salt and germanium dioxide in this example is 99.5:0.5 in weight percent. What is depicted here is the specifically required energy for removing $CO_2$ from a flue gas. The assumption here is that no process parameter other than the scrubbing solution used changes.

It can be seen that scrubbing solution 14 requires significantly less specific energy than scrubbing solution 13. As a result, for a given column size, scrubbing solution 14, activated with germanium dioxide, has significantly lower specific energy requirements.

Figure 2:
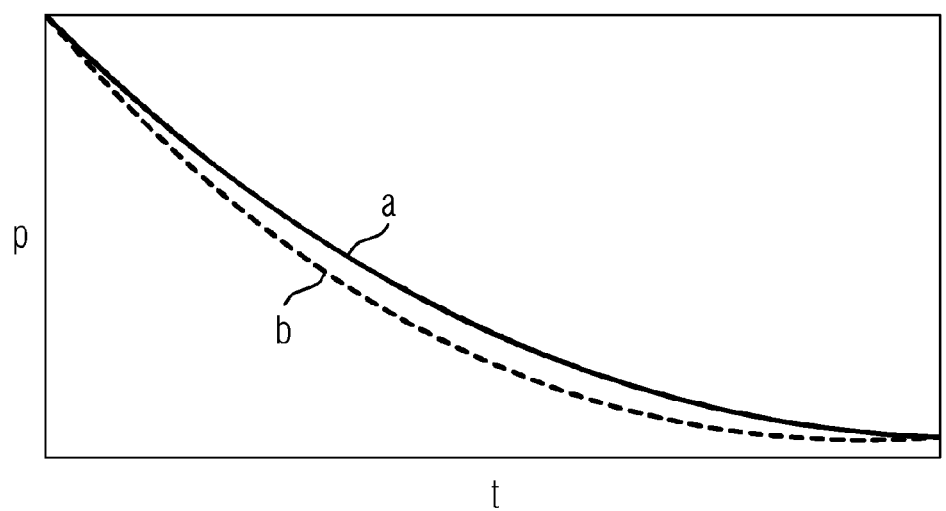
FIG. 2 shows a chart featuring two measured curves of the declining carbon dioxide pressure above different scrubbing solutions.

FIG. 2 shows how in a closed stirred cell at a temperature of 45° C. the pressure declines over time above an in-test scrubbing solution following admixture of 2.5 bar of carbon dioxide. Top curve a) corresponds to an aqueous scrubbing solution used with 30 weight percent of an amino acid salt. Bottom curve b) corresponds to the course on admixing an additional 0.3 weight percent of germanium dioxide to the same scrubbing solution.

It is clearly apparent that the pickup of gaseous carbon dioxide when germanium dioxide is used is quicker. For the same pickup capacity, therefore, the absorbers of an absorption plant for carbon dioxide can be designed smaller when the scrubbing solution is admixed with germanium dioxide as activator additive.

Figure 3:
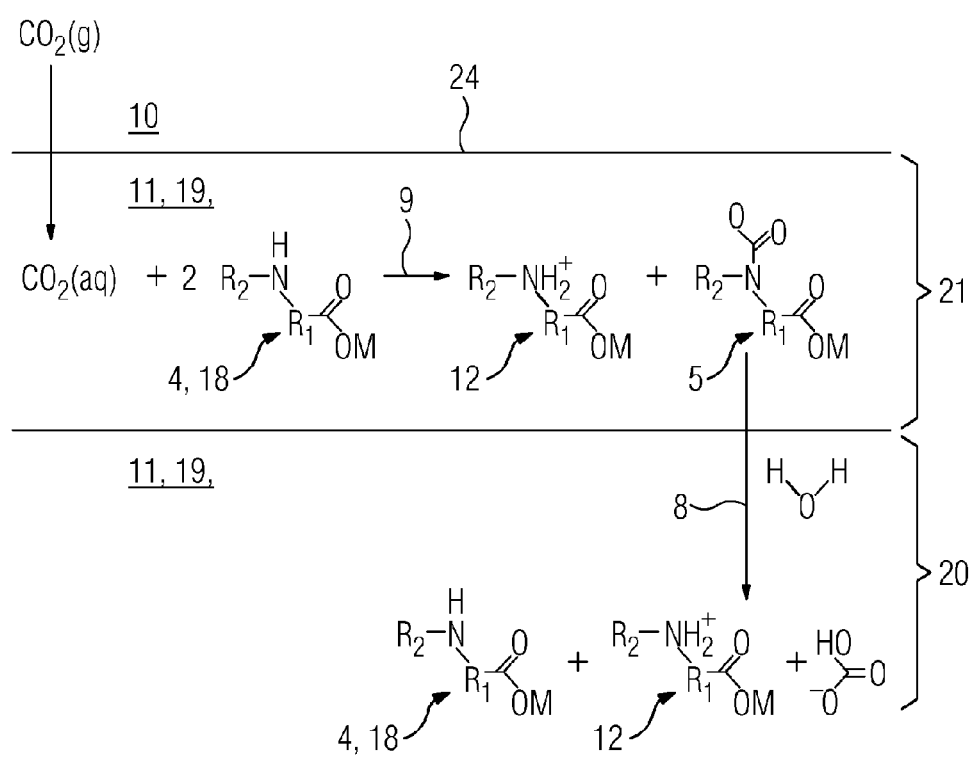
FIG. 3 shows a reaction diagram for the reaction of $CO_2$ with a secondary amino acid salt.

FIG. 3 shows a reaction diagram featuring the transition of $CO_2$ from the gas phase 10 into the boundary layer 21 of the liquid phase 11. The transition from the gas phase 10 into the boundary layer 21 is the interface 24. In the boundary layer 21, the $CO_2$ reacts with a secondary amino acid salt 4 as absorbent 18 via a fast reaction 9 to form the reaction product carbamate 5 and protonated amino acid salt 12.

The subsequent reaction, in which the reaction product further reacts with water to form bicarbonate and further reaction products, however, is a slow reaction 8, since it already takes place in the liquid bulk 20 of the scrubbing solution 19, where it is sterically hindered and proceeds distinctly slower than the carbamate formation in the boundary layer 21.

Figure 4:
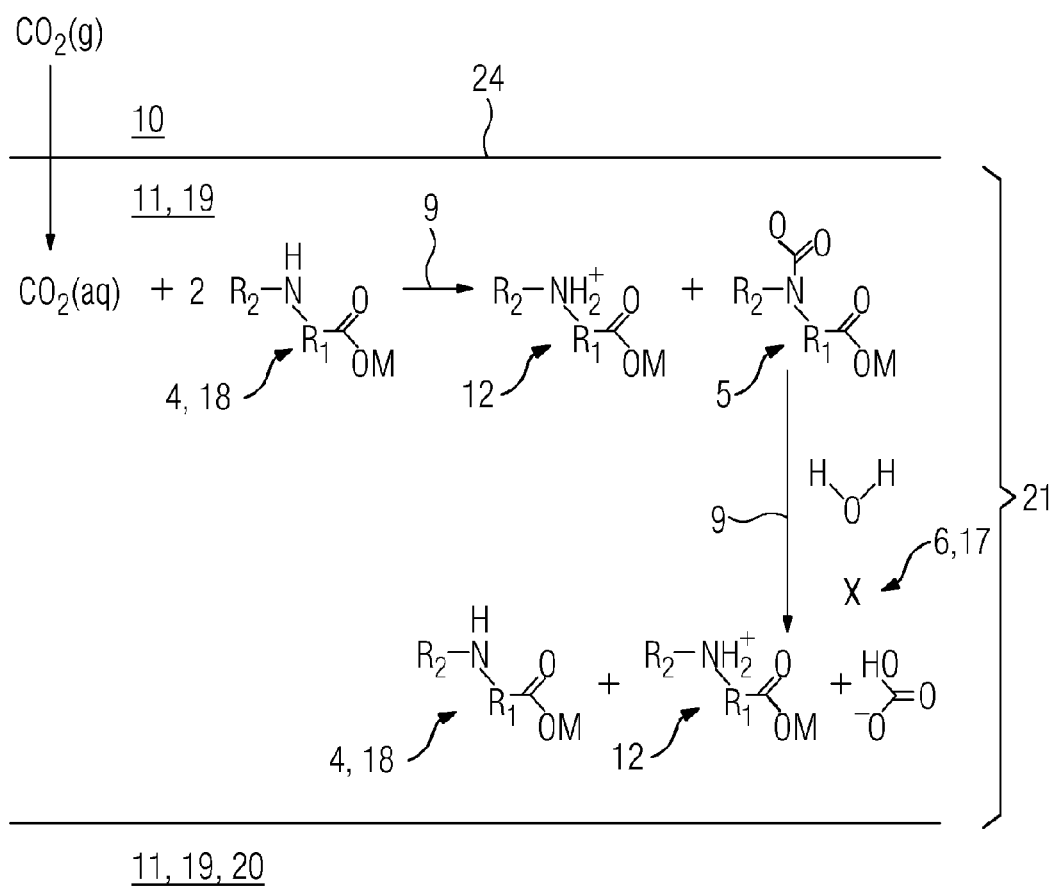
FIG. 4 shows a reaction diagram for the reaction of $CO_2$ with a secondary amino acid salt catalyzed with germanium dioxide.

FIG. 4, in contrast to FIG. 3, shows a reaction diagram where scrubbing solution 19 contains an activator additive 6 in the form of a germanium dioxide 17 as well as the secondary amino acid salt 7 as absorbent 18. What is shown is the gas phase 10 and the liquid phase 11. The liquid phase 11 subdivides into the boundary layer 21, which adjoins the gas phase 10, and the liquid bulk 20, which follows on the boundary layer 21.

The germanium dioxide has the effect that the bicarbonate formation proceeds as a fast reaction 9. This bicarbonate formation takes place in the boundary layer 21 of liquid phase 11, and not in the liquid bulk 20, and so the bicarbonate formation takes place in an accelerated manner. Owing to the faster bicarbonate formation, the CO2 is also faster to get from the gas phase 10 into the liquid phase 11.

In relation to the invention, merely a small addition of germanium dioxide is all that is needed to achieve an appreciable acceleration in the $CO_2$ capture process. A proportion of less than 10 weight percent has proved advantageous.

Figure 5:
FIG. 5 shows the chemical structure of potash as an example of an absorbent.

FIG. 5 shows an example of an absorbent 18. What is depicted is the chemical structural formula of potassium carbonate, colloquially also called potash 16.

Figure 6:
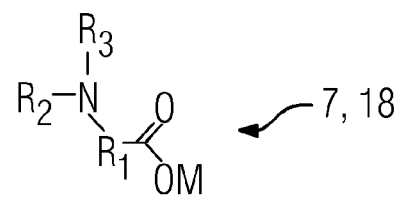
FIG. 6 shows the chemical structure of an amino acid salt as an example of an absorbent.

FIG. 6 shows a further example of an absorbent 18. What is depicted is the chemical structural formula of a general form of an amino acid salt 7, where O represents oxygen, N represents nitrogen, M represents alkali metals or alkaline earth metals and R represents a radical substituent. The radical substituents R1, R2 and R3 here may represent hydrogen H, an alkyl radical, an aryl radical, an alkylaryl radical, a heteroaryl radical, a halogen, CN or R—COO—.

Amino acid salts 7 are particularly advantageous for use as absorbents because they have no noticeable vapor pressure and thus cannot be dragged out into the atmosphere with the flue gas in the course of the absorption involved in the $CO_2$ capture process.

What is claimed is:

1. A carbon dioxide scrubbing solution consisting essentially of:
    an absorbent for carbon dioxide comprising an amino acid salt, and
    an absorption rate activator additive,
    wherein the activator additive comprises germanium dioxide.

2. The scrubbing solution as claimed in claim 1, wherein the proportion of germanium dioxide is between 0.01 and 10 weight percent.

3. The scrubbing solution as claimed in claim 1, wherein the proportion of germanium dioxide is between 0.05 and 2 weight percent.

4. The scrubbing solution as claimed in claim 1, wherein the absorbent further comprises a secondary, tertiary or sterically hindered amine, and/or a plurality of amino acid salts.

5. The scrubbing solution as claimed in claim 1, wherein the scrubbing solution is in the form of an aqueous solution.

6. A method for accelerating the absorption of carbon dioxide, comprising:
    contacting a gas comprising carbon dioxide with a carbon dioxide scrubbing solution consisting essentially of an absorbent comprising amines, or ethanolamines, or amino acid salts, or potash, or a combination, and also germanium dioxide, with absorption of carbon dioxide,
    wherein the carbon dioxide is physically dissolved in the scrubbing solution and chemically absorbed by the absorbent, and
    wherein the germanium dioxide is catalytically active for at least one reaction step of the chemical absorption of carbon dioxide.

7. The method as claimed in claim 6, wherein the germanium dioxide is adjusted in the scrubbing liquid to a proportion of 0.01 to 10 weight percent.

8. The method as claimed in claim 7, wherein the proportion of germanium dioxide is adjusted between 0.05 and 2 weight percent.

9. The method as claimed in claim 6, wherein the absorbent comprises secondary, tertiary or sterically hindered amines.

10. The method as claimed in claim 6, wherein the gas which is treated as comprising carbon dioxide is the flue gas of a fossil fuel steam power plant, of a gas turbine plant or of a combined gas and steam turbine plant.

11. A composition of matter comprising:
    a carbon dioxide scrubbing solution, the solution further comprising:
    a liquid phase comprising a liquid bulk and a boundary layer on the liquid bulk when the scrubbing solution adjoins a gas phase comprising carbon dioxide;
    the liquid phase further comprising a solution comprising a carbon dioxide absorbent and germanium dioxide; and
    wherein the germanium dioxide is at a concentration effective to be catalytically active in at least one reaction step of chemical absorption of carbon dioxide in the boundary layer.

12. The composition of claim 11, further comprising:
    the liquid phase comprises an aqueous solution; and
    the germanium dioxide is at a concentration effective to catalyze a carbamate-water reaction, forming bicarbonate, in the boundary layer.

13. The composition of claim 12, wherein the germanium dioxide is at a concentration effective to catalyze the bicarbonate formation in the boundary layer and not in the liquid bulk.

14. The composition of claim 11, further comprising:
the liquid phase comprising an aqueous solution; and
the germanium dioxide at a concentration of 0.01 to 10 weight percent and effective to catalyze a fast carbamate-water reaction in the boundary layer.

15. The composition of claim 11, wherein the carbon dioxide absorbent comprises an amino acid salt.

16. The composition of claim 11, wherein the carbon dioxide absorbent comprises a secondary amino acid salt, and wherein the germanium dioxide is at a concentration effective to be catalytically active in forming a protonated amino acid salt in the boundary layer.

* * * * *